United States Patent [19]
Parmeter et al.

[11] Patent Number: 5,828,149
[45] Date of Patent: *Oct. 27, 1998

[54] LUBRICANT INDUCER PUMP FOR ELECTRICAL MOTOR

[75] Inventors: Larry J. Parmeter, Bartlesville; Earl B. Brookbank, Claremore, both of Okla.

[73] Assignee: Baker Hughes Incorported, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 683,442

[22] Filed: Jul. 18, 1996

[51] Int. Cl.$^6$ .............................. F04B 17/00; F04B 15/08
[52] U.S. Cl. ........................ 310/87; 310/67 R; 310/61; 417/423.1; 417/423.3; 417/423.5
[58] Field of Search ................................ 310/60 A, 60 R, 310/61, 87; 417/423.1, 423.13, 423.3, 368–369, 423.5, 410.4, 41.5

[56] References Cited

U.S. PATENT DOCUMENTS

| | | | |
|---|---|---|---|
| 2,315,917 | 4/1943 | Arutunoff | 172/36 |
| 2,583,583 | 1/1952 | Mangan | 230/206 |
| 3,480,810 | 11/1969 | Potter | 310/54 |
| 3,671,786 | 6/1972 | Jones | 310/87 |
| 3,848,702 | 11/1974 | Bergman | 184/6.3 |
| 3,975,117 | 8/1976 | Carter | 417/370 |
| 4,143,999 | 3/1979 | Ryall | 417/424 |
| 4,901,413 | 2/1990 | Cotherman et al. | 29/890.14 |
| 4,957,504 | 9/1990 | Chardack | 623/17 |
| 5,140,009 | 8/1992 | Haviv et al. | 514/16 |
| 5,171,835 | 12/1992 | Janaky et al. | 530/313 |
| 5,341,901 | 8/1994 | Mueller et al. | 184/6.12 |
| 5,482,117 | 1/1996 | Kolpak et al. | 166/265 |
| 5,516,360 | 5/1996 | Normandeau et al. | 96/207 |
| 5,527,159 | 6/1996 | Bozeman, Jr. et al. | 417/45 |
| 5,659,205 | 8/1997 | Weisser | 290/52 |

FOREIGN PATENT DOCUMENTS

| | | |
|---|---|---|
| 0280660A2 | 8/1988 | European Pat. Off. . |
| 0640606 | 3/1995 | European Pat. Off. . |
| 61-191698 | 8/1986 | Japan . |
| 1349389 | 4/1974 | United Kingdom . |
| WO93/22557 | 11/1993 | WIPO . |

OTHER PUBLICATIONS

Fujino et al., "Synthetic Analogs of Luteinizing Hormone Releasing Hormone (LH–RH) Substituted in Position 6 and 10", Biochemical and Biophysical Research Communications, vol. 60, No. 1, 1974 pp. 406–413.

Seirikagaku 2, Bunkodo, pp. 610–618, 1986. (Abstract).

Receptor Kiso To Rinsho, Asakurashoten, pp. 297–304, 1993. (Abstract).

R. C. Coombes, British Journal of Cancer, vol. 59, 1989, pp. 815–832.

H. Navratil et al. "Clinical Progress with LHRH Analogues in Prostatic Cancer", The Journal of International Medical Research, vol. 18 (suppl 1) (1990) pp. 35–41.

Schally et al., "Isolation of The Luteinizing Hormone and Follicle–Stimulating Hormone–Releasing Hormone From Porcine Hypothalami", The Journal of Biological Chemistry, vol. 246, No. 23, (1971), pp. 7230–7236.

Burgus et al., "Primary Structure of The Ovine Hypothalamic Luteinizing Hormone–Releasing Factor (LRF)", Proceedings of the National Academy of Sciences, vol. 69, No. 1 (1972) pp. 278–282.

Bienstock et al., "Conformational Analysis of A Highly Potent Dicyclic Gonadotropin–Releasing Hormone Antagonist by Nuclear Magnetic Resonanace and Molecular Dynamics", Journal of Medicinal Chemistry, vol. 36, (1993), pp. 3265–3273.

*Primary Examiner*—Thomas M. Dougherty
*Assistant Examiner*—Tran N. Nguyen
*Attorney, Agent, or Firm*—James E. Bradley

[57] ABSTRACT

An inducer pump located internally in an electrical submersible pump motor enhances lubricant circulation within the motor. The inducer is located at the lower end of the shaft within a shaft bore. The inducer has a rod and a helical flight rigidly mounted to the rod. The inducer rotates in unison with the motor, pumping lubricant from a lower lubricant chamber upward through the shaft bore.

4 Claims, 2 Drawing Sheets

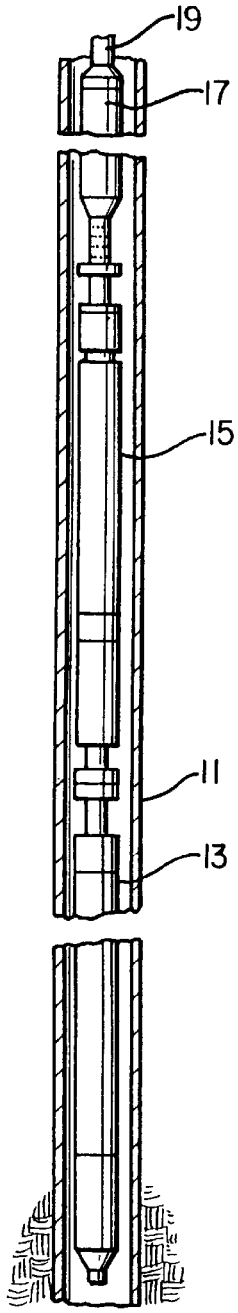
FIG. 1
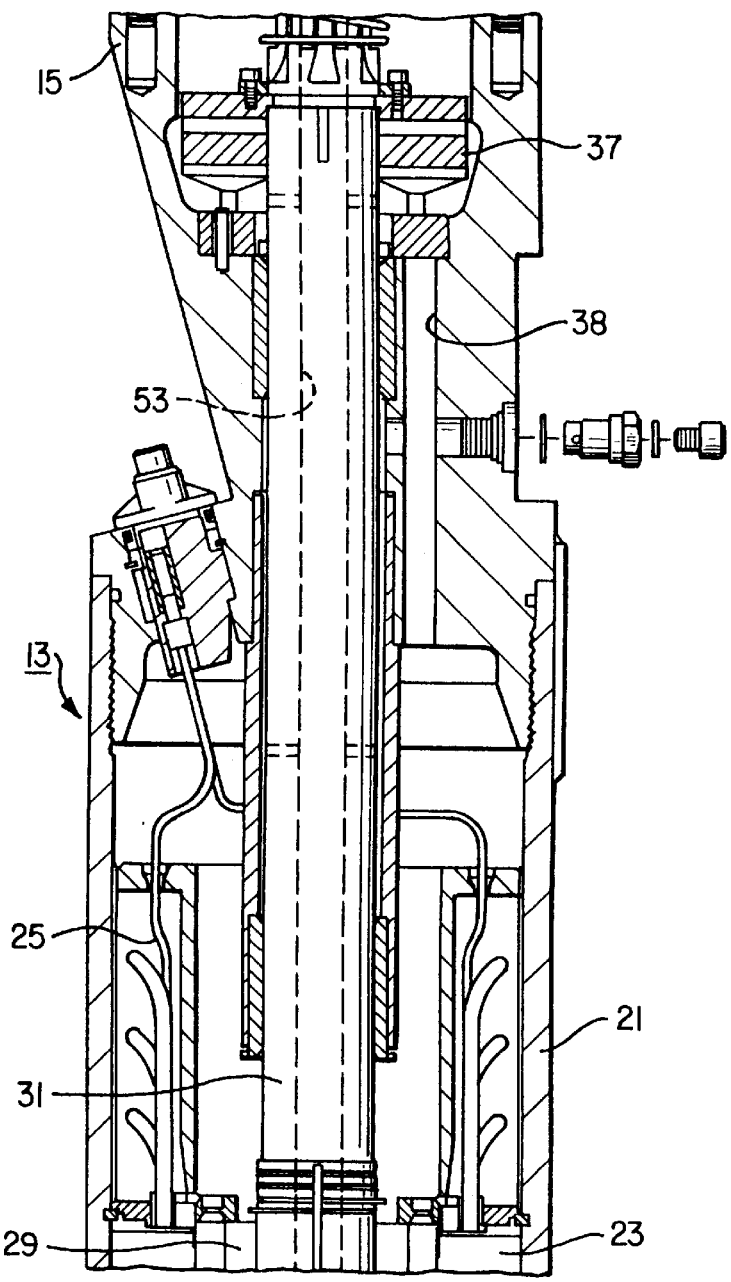
FIG. 2A
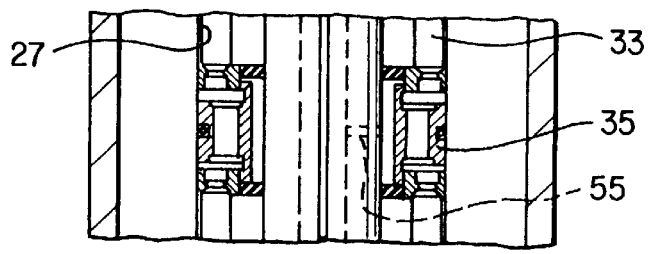

# LUBRICANT INDUCER PUMP FOR ELECTRICAL MOTOR

TECHNICAL FIELD

This invention relates in general to electrical submersible pump systems for oil wells, and in particular to an internal inducer pump located in the electrical motor of the submersible pump assembly for circulating lubricant within the motor.

BACKGROUND ART

Electrical submersible pumps are used for pumping oil and water from wells. A typical electrical submersible pump assembly has an electrical motor that is located at the bottom of the assembly. The motor is connected to a seal section, and the seal section is connected to a centrifugal pump. The seal section and motor are filled with lubricant. The seal section reduces pressure differential between the lubricant in the motor and the hydrostatic pressure in the well bore, and also serves as a barrier against the entry of well bore fluid into the motor. The pump is supported by a string of tubing and discharges into the tubing.

Large submersible pump assemblies utilize one or two electrical motors having several hundred horsepower. A motor may be 30 feet long or more and is housed in a cylindrical housing that is several inches in diameter. Heat is generated in the motor due to its operation. Also, some wells bores can be at fairly high temperatures. The lubricant in the motor not only lubricates the bearings, but also serves to cool the motor.

In most cases, the well fluid flowing past the motor and the lubricant within provides adequate cooling to prevent overheating of the motor. In the past, forced circulation of the lubricant within the motor has been employed as well. This involved placing a pump stage within a lubricant chamber at the lower end of the motor. The pump stage in the prior art was of a centrifugal type, having an impeller that rotated within a difuser. The impeller was secured to a lower end of the shaft for rotation with the shaft. A filter was located below the impeller for filtering the intake of lubricant from the lubricant chamber. The impeller discharged lubricant into an axial bore in the motor shaft. Lateral passages extended from the axial bore shaft to the exterior at the radial bearings.

While this internal lubricant circulation system is workable, the lubricant centrifugal pump stage adds appreciably to the expense of the motor and has not been used extensively.

DISCLOSURE OF INVENTION

In this invention, an inducer pump is located internally at the lower end of the motor for circulating lubricant. The inducer pump comprises a rod with a helical flight mounted to the rod. The helical flight extends substantially to the side wall of the shaft bore, defining a helical fluid path between the side wall of the axial bore and the rod. The inducer pump is located at the lower end of the shaft, and extends upward a few inches. The inducer pump rotates with the shaft, inducing lubricant in the motor housing to flow upward through the axial bore in the shaft.

BRIEF DESCRIPTION OF DRAWINGS

FIG. 1 is a schematic side elevational view illustrating an electrical submersible pump assembly in accordance with this invention.

FIGS. 2A, 2B and 2C comprise a vertical sectional view of portions of the motor used with the pump assembly of FIG. 1.

BEST MODE FOR CARRYING OUT THE INVENTION

Figure 2B:
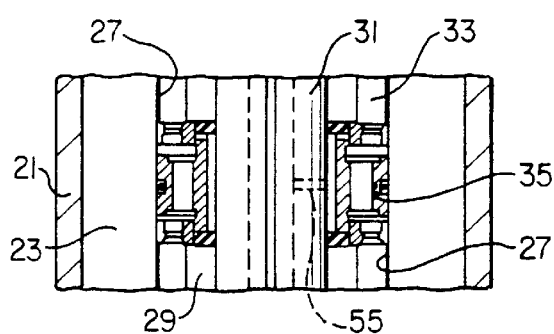
Figure 2B:
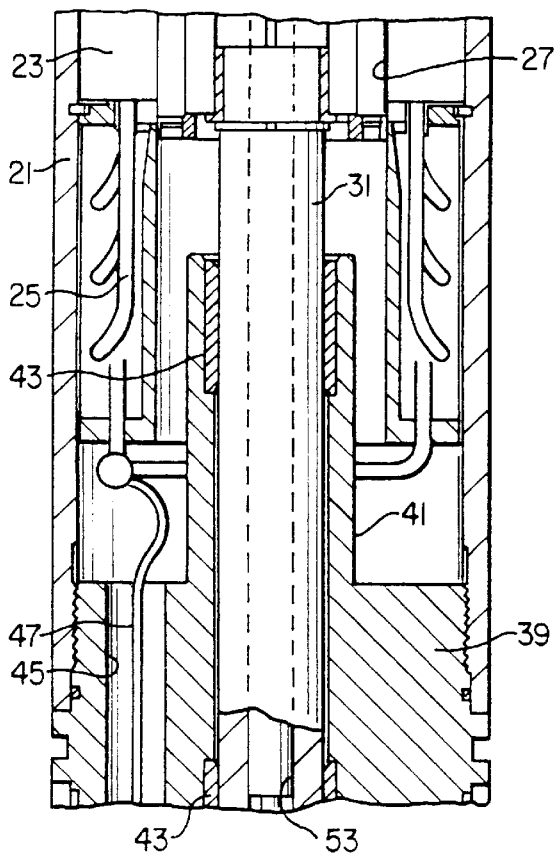

Referring to FIG. 1, the well has a casing 11, which will be perforated to allow the flow of formation fluids into casing 11. The electrical submersible pump assembly includes on a lower end an alternating current electrical motor 13. Motor 13 is a long tubular member connected on its upper end to a seal section 15. Seal section 15 has conventional equalizing means for reducing the differential between lubricant pressure within motor 13 and hydrostatic pressure in casing 11. Seal section 15 is connected on its upper end to a centrifugal pump 17.

Pump 17 has a large number of pump stages, each having an impeller and a differ. The intake of pump 17 is at its lower end, and pump 17 discharges at its upper end into a string of tubing 19 leading to the surface. The electrical submersible pump assembly is supported by the string of tubing 19. Electrical power is supplied from the surface to motor 13 which rotates a shaft that extends to pump 17 to rotate the impellers.

Referring to FIG. 21A motor 13 includes a cylindrical housing 21. A stator 23 is stationarily mounted in housing 21. Stator 23 comprises a large number of stator disks having slots through them which are interlaced with three-phase copper wire windings 25. Stator 23 has an axial passage 27 that extends through it.

A rotor 29 is located within stator passage 27. Rotor 29 is mounted to a shaft 31 for rotating shaft 31. Alternating current supplied to windings 25 causes rotor 29 to rotate. An annular clearance 33 is located between the wall of stator passage 7 and the exterior of rotor 29. A plurality of radial support bearings 35 are spaced along rotor 29 to radially support shaft 31 in stator passage 27. Bearings 35 having an inner sleeve secured by a key to shaft 31, and an outer sleeve that frictionally and stationarily engages the wall of stator passage 27. A thrust bearing 37 is located within seal section 15 in engagement with shaft 31 and prevents downward movement of shaft 31 in housing 21. A passage 38 extends through the lower end of seal section 15 to communicate lubricant in seal section 15 with lubricant in motor 13.

Figure 2C:
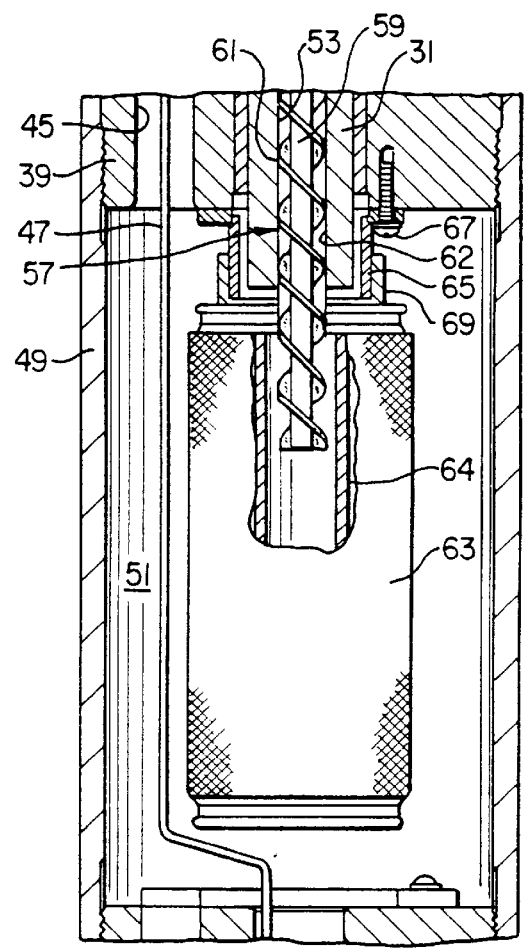

Referring to FIGS. 2B and 2C, a base 39 is located at the lower end of housing 21. Base 39 is a cylindrical member secured by threads to housing 21. Base 39 has an upward protruding neck 41. Bushings 43 are located in neck 41 and in base 39 for rotational engagement with shaft 31. Base 39 is located a short distance below the lower end of stator 23. A passage 45 extends downward through base 39 parallel to and offset from the axis of motor 13. In the embodiment shown, a sensor wire 47 is tapped into one of the windings 25 and extends downward through base passage 45 for connection to a pressure and temperature sensor (not shown) located at the lower end of motor 13.

A chamber housing 49 secures to threads on base 39 and extends downward. Chamber housing 49 is cylindrical and may be considered as part of motor housing 21. Chamber housing 49 has an internal chamber 51. The lower end of shaft 31 extends a short distance below base 39 and into the upper end of chamber housing 49. As shown in FIGS. 2A, 2B and 2C, shaft 31 has an axial bore 53 that extends from its lower end to its upper end. A number of lateral passages 55 intersect shaft bore 53 and extend to the exterior, as shown in FIGS. 2A and 2B. Lateral passages 55 are preferably located in alignment with the radial bearings 35.

An inducer 57 is mounted stationarily in shaft bore 53 at the lower end of shaft 31, as shown in FIG. 2C. Inducer 57 has an axial rod 59 that extends along the axis of shaft 31. At least one helical flight 61 is rigidly attached to rod 59, and in the preferred embodiment, there are two of the helical flights 61. A set of threads 62 are formed in the lower end of shaft bore 53. The edges of flights 61 have threads which engage threads 62 to secure inducer 57 rigidly within shaft bore 53. The edges of flights 61 thus substantially touch the side walls of shaft bore 53.

Flights 61 and rod 59 rotate in unison with shaft 31. When viewed from above looking downward, shaft 31 will normally rotate clockwise. Flights 61 extend in an opposite direction to the rotation so that this rotation induces an upward flow of lubricant through shaft bore 53. In other words, when viewed from above, flights 61 extend from the lower end award in a counterclockwise direction. In this embodiment, the lower end of inducer 57 is located about four inches below the lower end of shaft 31. The total length of inducer 57 is approximately eight inches in one embodiment, while shaft 31 may be 30 feet or more in length. The upper end of inducer 57 is below the lowermost lateral passage 55. The diameter of shaft bore 53 is preferably ¾ inch or less. The pitch of helical flights 61 is selected to provide a flow rate of lubricant through shaft bore 53 of about ⅓ to 1½ gallons per minute. In fixed speed motors 13, shaft 31 rotates normally about 3600 rpm.

Referring still to FIG. 2C, a filter 63 mounts in chamber 51. Filter 63 is annular, having a porous sidewall through which lubricant will flow. As shown by the broken out portion, filter 63 has a central passage 64 which has apertures (not shown) therein for recieving the flow of lubricant through the wall and passing the lubricant to an outlet 65 on the upper end of filter 63.

In this embodiment, inducer 57 extends downward a few inches from shaft 31 into central passage 64. Inducer 57 rotates relative to central passage 64. A small clearance of about 0.020 inch on a side is located between central passage 64 and the periphery of helical flights 61.

Outlet 65 is a tubular member that has a flange on its upper end which secures to the lower side of base 39 by fasteners 67. A sleeve 69 is formed with filter 63, extends sealingly around outlet 65, and forms a part of outlet 65. The lower end of shaft 31 extends into outlet 65 and terminates a short distance above filter 63.

In operation, motor 13 and seal section 15 will be filled with a lubricating oil. As the assembly is lowered into the well, the equalizing means within seal section 15 will tend to equalize the pressure of the lubricant in motor 13 with hydrostatic pressure in casing 11. Once in position, electrical power will be supplied from the surface to windings 25, causing rotor 29 to rotate. Shaft 31 drives the pump stages of centrifugal pump 15. As shaft 31 rotates, inducer 57 will rotate with it. This causes lubricant in chamber 51 to pass through filter 63, up outlet 65, and into shaft bore 53. Inducer 57 pumps the lubricant up shaft bore 53 and out lateral passages 55. The upper end of shaft bore 53 may be open, in which case some of the lubricant will discharge into seal section 15. Lubricant within motor housing 21 flows downward through the clearance 33 between rotor 29 and stator passage 27. Lubricant flows downward through base passage 45 and into lubricant chamber 51, where it is drawn through filter 63 and circulated up shaft bore 53.

Figure 3:
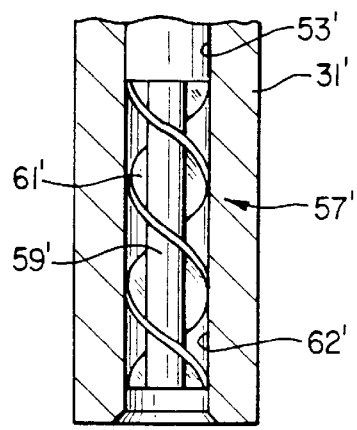
FIG. 3 is an enlarged sectional view of the lower end of the shaft of the motor of FIGS. 2A, 2B and 2C, showing an alternate embodiment of an inducer pump in accordance with this invention.

FIG. 3 shows an alternate embodiment wherein inducer 59' is wholly located within axial bore 53' of shaft 31' and secured by threads 62'. The lower end of helical flights 61' is a short distance above the lower end of shaft 31. Although in this embodiment inducer 59' does not rotate within a stationary tube such as central passage 64 of filter 63 (FIG. 2C), it is capable of inducing flow of lubricant up shaft axial passage 53'.

The invention has significant advantages. The inducer enhances circulation of lubricant within the motor to cool the components. The inducer is of single piece construction and inexpensive.

While the invention has been shown in only one of its forms, it should be apparent to those skilled in the art that it is not so limited but susceptible to various changes without departing from the scope of the invention.

We claim:

1. A downhole electrical motor for a submersible well pump, comprising in combination:

a cylindrical housing having a longitudinal axis;

a stator mounted in the housing and having an axial passage;

a rotor which is mounted to a shaft for rotation about the longitudinal axis within the axial passage of the stator, defining an annular clearance between the rotor and the stator;

a plurality of radial support bearings axially spaced along the length of the rotor and in stationary engagement with the stator;

a base in the housing below the stator for radially supporting a lower end of the shaft;

a lubricant chamber located in the housing below the base;

an axial bore in the shaft extending upward from the lower end of the shaft along the length of the shaft, the axial bore having a cylindrical sidewall;

a plurality of lateral passages extending from the axial bore to an exterior of the shaft and spaced along the length of the rotor;

a filter located in the lubricant chamber, having a porous media wall through which lubricant in the chamber passes, a perforated central tube which receives the lubricant, and an upper outlet, the filter being fastened to the lower end of the base with the central tube axially aligned with the shaft;

an inducer pump mounted in the axial bore for rotation with the shaft, the inducer pump having a helical flight, the inducer pump extending downward from the shaft and into the central tube of the filter, the inducer pump rotating relative to the central tube so as to cause lubricant from the lubricant chamber to flow through the filter up the axial bore and out the lateral passages for circulating lubricant through the bearings when the shaft rotates, the lubricant flowing back down the annular clearance to the lubricant chamber and filter.

2. A downhole electrical motor for a submersible well pump, comprising in combination:

a cylindrical housing having a longitudinal axis and filled with a lubricant;

a rotor mounted to a shaft in the housing for rotation about the longitudinal axis;

at least one radial support bearing engaging the rotor;

an axial bore in the shaft extending upward from a lower end of the shaft;

at least one lateral passage extending from the axial bore to an exterior of the shaft;

a tube stationarily mounted in the housing below and in axial alignment with the shaft, the tube having an interior passage in fluid communication with the lubricant; and an inducer pump having a helical flight and located in the axial bore at the lower end of the shaft, the inducer pump rotating in unison with the shaft, the helical flight having a lower end which extends into the interior passage of the tube and rotates relative to the tube to force the lubricant up the axial bore, out the lateral passage and through the bearing.

3. The motor according to claim 2, wherein the tube is perforated.

4. The motor according to claim 2, wherein the tube is perforated and wherein the motor further comprises:

filter media located in the housing below the shaft and surrounding the tube, the filter media allowing communication of lubricant to the inducer pump through the filter media and the tube.

* * * * *

UNITED STATES PATENT AND TRADEMARK OFFICE
CERTIFICATE OF CORRECTION

PATENT NO. : 5,828,149

DATED : October 27, 1998

INVENTOR(S) : Larry J. Parmeter and Earl B. Brookbank

It is certified that error appears in the above-identified patent and that said Letters Patent is hereby corrected as shown below:

On the title page: Item [56]: under "U.S. Patent Documents",
delete "5,140,009  8/1992  Haviv et .....514/16
        5,171,835 12/1992  Janaky et al ....530/313"
      under "FOREIGN PATENT DOCUMENTS",
      delete "0640606  3/1995  European Patent Off.
              61-191698 8/1986 Japan".

Signed and Sealed this

Second Day of March, 1999

Attest:

Q. TODD DICKINSON

*Attesting Officer*   *Acting Commissioner of Patents and Trademarks*